United States Patent
Klatt et al.

(10) Patent No.: US 11,378,074 B2
(45) Date of Patent: Jul. 5, 2022

(54) DISCHARGE CUT-OFF VALVE

(71) Applicant: WABCO Europe BVBA, Brussels (BE)

(72) Inventors: Michael Klatt, Wadmalaw Island, SC (US); Ramesh Pai, Charleston, SC (US)

(73) Assignee: ZF CV SYSTEMS EUROPE BV, Brussels (BE)

( * ) Notice: Subject to any disclaimer, the term of this patent is extended or adjusted under 35 U.S.C. 154(b) by 3 days.

(21) Appl. No.: 17/008,692

(22) Filed: Sep. 1, 2020

(65) Prior Publication Data

US 2022/0065241 A1 Mar. 3, 2022

(51) Int. Cl.
| | |
|---|---|
| *F04B 49/24* | (2006.01) |
| *F04B 39/12* | (2006.01) |
| *F04B 39/16* | (2006.01) |
| *F16K 3/06* | (2006.01) |
| *F04B 49/035* | (2006.01) |
| *F04B 39/08* | (2006.01) |
| *F04B 39/10* | (2006.01) |

(52) U.S. Cl.
CPC ............ *F04B 49/24* (2013.01); *F04B 39/125* (2013.01); *F04B 39/16* (2013.01); *F04B 49/035* (2013.01); *F16K 3/06* (2013.01); *F04B 39/08* (2013.01); *F04B 39/1073* (2013.01)

(58) Field of Classification Search
CPC .. F16K 3/04; F16K 3/06; F04B 39/123; F04B 39/125; F04B 39/16; F04B 39/08; F04B 49/03; F04B 49/035; F04B 49/246; F04B 49/24

See application file for complete search history.

(56) References Cited

U.S. PATENT DOCUMENTS

| | | | | |
|---|---|---|---|---|
| 4,505,122 A | * | 3/1985 | Inomata ................. | F04B 49/02 137/625.31 |
| 4,932,631 A | * | 6/1990 | Heger ..................... | F04B 39/08 251/228 |
| 5,101,857 A | * | 4/1992 | Heger ................. | F04B 39/1086 137/601.15 |

(Continued)

FOREIGN PATENT DOCUMENTS

DE 3329790 A1 * 2/1985 ............ F04B 49/243

OTHER PUBLICATIONS

English Machine Translation of DE-3329790-A1 (Year: 1985).*

*Primary Examiner* — Nathan C Zollinger
(74) *Attorney, Agent, or Firm* — Warner Norcross + Judd LLP

(57) ABSTRACT

A discharge cut-off valve for an air compressor is provided. The discharge cut-off valve includes a hinged leaf valve within the recessed portion of a cylinder head manifold. The hinged leaf valve is rotatably anchored at a first end to a joint pin and is guided at a second end by a guide pin. In the on-load phase, the hinged leaf valve is seated over an unloader vent opening while a discharge vent opening is uncovered. In the off-load phase, the hinged leaf valve is seated over the discharge vent opening while the unloader vent opening is uncovered. As a result, compressed air is prevented from escaping the discharge port of the air compressor during the off-load phase, obviating the need for a down-stream turbo cut-off valve in an air dryer, for example.

17 Claims, 5 Drawing Sheets

(56) References Cited

U.S. PATENT DOCUMENTS

| | | | | |
|---|---|---|---|---|
| 5,503,537 | A | * | 4/1996 | Schlossarczyk .... F04B 39/0055 |
| | | | | 417/296 |
| 5,873,706 | A | * | 2/1999 | Kawabata ........... F04B 27/1036 |
| | | | | 417/295 |
| 6,082,978 | A | * | 7/2000 | Tetour ..................... F04B 39/08 |
| | | | | 417/510 |
| 6,261,068 | B1 | * | 7/2001 | Kramer .................. F04B 39/08 |
| | | | | 417/297 |
| 8,960,073 | B2 | * | 2/2015 | Pai ........................ F04B 49/246 |
| | | | | 92/164 |
| 9,915,255 | B2 | * | 3/2018 | Vosse .................... F04B 49/035 |
| 2006/0196168 | A1 | * | 9/2006 | Seitz ........................ B60T 17/02 |
| | | | | 60/278 |
| 2014/0234131 | A1 | * | 8/2014 | Holzel .................. F04B 39/125 |
| | | | | 417/298 |

* cited by examiner

DISCHARGE CUT-OFF VALVE

FIELD OF THE INVENTION

The present invention relates to air compressors, and in particular, air compressor unloader mechanisms for use with air brake systems in commercial vehicles.

BACKGROUND OF THE INVENTION

In commercial vehicles, air compressors function to provide and maintain air under pressure to operate devices in air brake and auxiliary air systems. Air compressors for this purpose often include a single-cylinder reciprocating design having a crankcase (cylinder block) and a cylinder head. The crankcase contains the cylinder bore, piston, bearings, crankshaft, and connection rod, while the cylinder head contains the inlet, discharge, and unloader valves.

During operation, the compressor is driven by the vehicle's engine and functions continuously while the engine is running. As the piston begins the down stroke from top dead center, a vacuum created above the piston causes an inlet valve to open. Atmospheric or pressurized air flows through the open inlet valve and fills the piston chamber. At bottom dead center, the inlet valve closes. As the piston moves upward from bottom dead center, air above the piston is compressed. When this air reaches a pressure greater than a system pressure, the discharge valve opens and allows compressed air to flow into the discharge line, which supplies compressed air to an air dryer and ultimately a supply reservoir in the on-load phase.

Switching to an off-load phase is controlled by a governor and the compressor unloader valve. When air pressure in the supply reservoir reaches the cutout setting of the governor, the governor delivers system air to the compressor unloader valve. The compressor unloader valve then opens an air passageway between the piston chamber and the air inlet, and the air compressor enters into off-load phase and simultaneously, the air dryer switches into purge cycle which directs the discharge line to vent (atmospheric pressure). With pressurized induction systems (boosted compressor intake), the engine's turbocharged air can now pass thru the compressor and vent at the air dryer's purge valve which can result in engine inefficiencies due to the loss of precious turbocharged air.

In modern systems, the air compressor is required to rely on an external device, typically at the air dryer, having a turbo cut-off valve (TCOV). The TCOV blocks air from flowing out during the off-load phase of the air compressor. This blocked discharge is required for turbocharged applications and also with modern air processing units to improve efficiency of the air system. When a TCOV is not available in an existing air system, the existing air dryer is replaced with an air dryer having a TCOV, but at considerable expense.

Accordingly, there remains a continued need for an improved system that ensures a blocked discharge during the off-load phase of the compressor. In particular, there remains a continued need for an improved air compressor with an integrated discharge cut-off valve to eliminate the need to incorporate a TCOV into air dryer systems.

SUMMARY OF THE INVENTION

A discharge cut-off valve to prevent airflow from the discharge port of an air compressor during the off-load phase, and a related method of operation, are provided. This discharge cut-off valve eliminates the need to have a Turbo Cut-Off Valve (TCOV) down stream, in the air dryer for example, for boosted air compressors and naturally aspirated air compressors.

In one embodiment, the discharge cut-off valve includes a hinged leaf valve disposed within the recessed portion of a cylinder head manifold. The hinged leaf valve is rotatably anchored at a first end to a joint pin and is guided at a second end by a guide pin. The hinged leaf valve is biased in a first position during the on-load phase and is movable to a second position in response to an unloader valve during the off-load phase. In the first position, the hinged leaf valve is seated over an unloader vent opening while a discharge vent opening is uncovered. In the second position, the hinged leaf valve is seated over the discharge vent opening while the unloader vent opening is uncovered. As a result, air is prevented from escaping the discharge port of the air compressor during the off-load phase, obviating the need for a down-stream cut-off valve.

The guide pin is movable along a groove in the recessed portion by actuation of the unloader valve, which is in turn responsive to a governor. The cylinder head manifold includes a bearing face surrounding the recessed portion, the bearing face including a plurality of inlet openings for fluid communication between a suction chamber and a piston chamber. The hinged leaf valve is separate from an inlet valve and a discharge valve, which control the flow of air to and from the piston chamber, respectively, and which are optionally reed valves.

In another embodiment, a method of operation is provided. The method of operation includes providing an air compressor including an inlet port for attachment to a supply of optionally boosted air and a discharge port for attachment to an air dryer lacking a turbo-cut off valve. The method further includes preventing the discharge of compressed air from the discharge port by actuation of an internal discharge cut-off valve during an off-load phase. The discharge cut-off valve includes a hinged leaf valve that is movable between a first position during the on-load phase and a second position during the off-load phase. In the first position, the hinged leaf valve is seated over at least one unloader vent opening. In the second position, the hinged leaf valve is seated over a discharge vent opening. The unloader vent opening is connected between a piston chamber of the air compressor and a suction chamber of the air compressor, and the discharge vent opening is connected between a piston chamber of the air compressor and a discharge chamber of the air compressor.

During the on-load phase, the hinged leaf valve covers the unloader vent openings while the discharge vent opening is uncovered. In this on-load phase, boosted or naturally aspirated air flows into the piston chamber via the intake openings, and compressed air within the piston chamber passes through a discharge valve and the discharge vent opening, ultimately through the discharge port for output to an air dryer. During the off-load phase, the governor signal received in the form of system pressure causes movement of the guide pin via the unloader valve. The guide pin causes rotation of the hinged leaf valve to the second position. In this position, unloader vent openings are uncovered, and air within the piston chamber is in fluid communication with the suction chamber within the cylinder head. Compressed air is allowed to pass through the unloader vent opening, ultimately through the compressor inlet port in fluid communication with air inlet line, while air is prevented from escaping the discharge port of the air compressor.

These and other features and advantages of the present disclosure will become apparent from the following description of particular embodiments, when viewed in accordance with the accompanying drawings and appended claims.

DETAILED DESCRIPTION OF THE CURRENT EMBODIMENT

The current embodiment includes a discharge cut-off valve to shut off the airflow from the discharge port of an air compressor during the off-load phase of the unloader mechanism. This discharge cut-off valve eliminates the need to have a Turbo Cut-Off Valve (TCOV) down stream, in the air dryer, for boosted air compressor applications or for any compressor, including naturally aspirated compressors, that require a blocked discharge port during the off-load phase.

Figure 1:
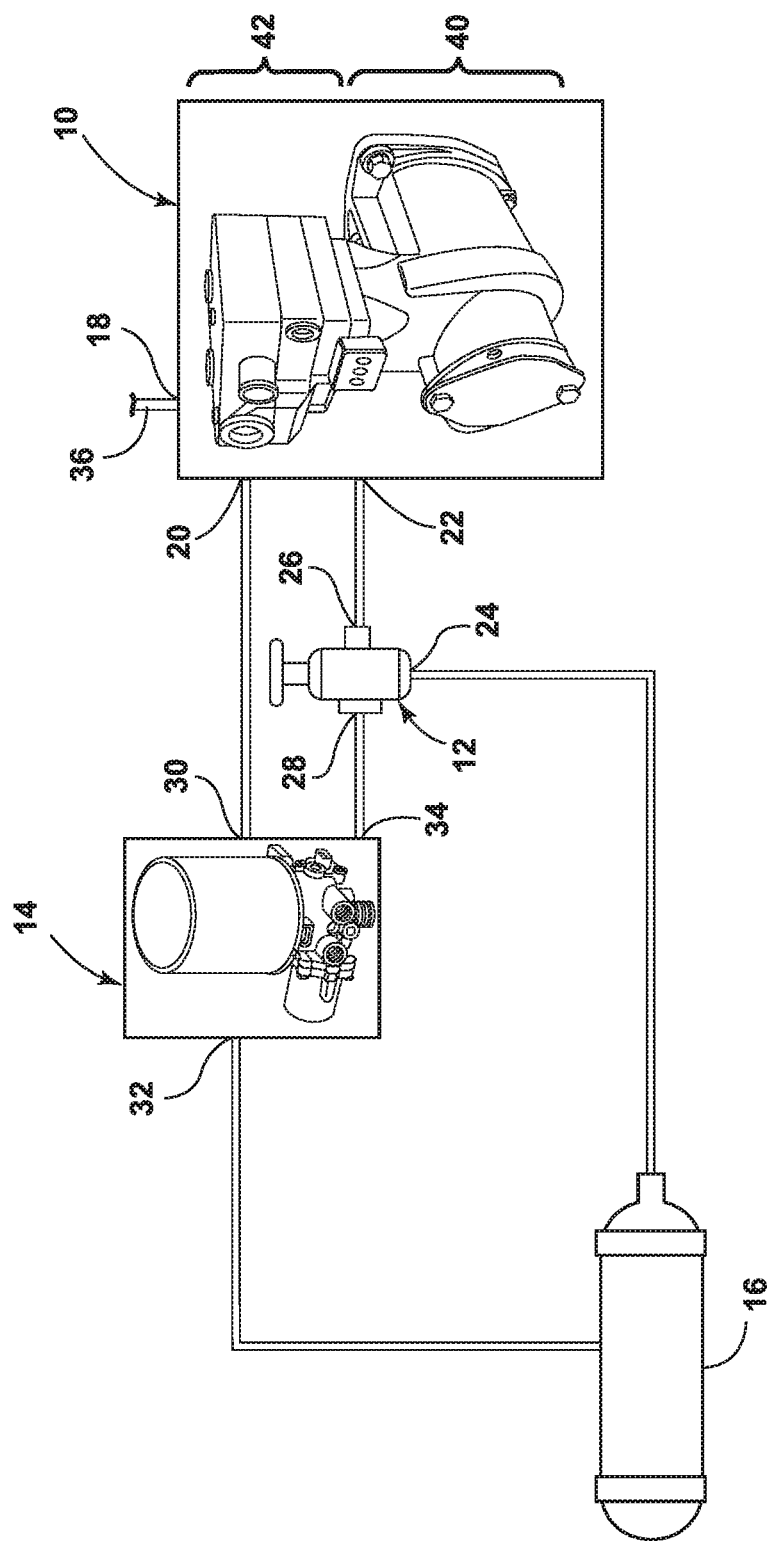
FIG. 1 is a schematic diagram of a pneumatic circuit including an air compressor that is adapted to be coupled to a source of turbocharged or ambient air.

Referring to FIG. 1, a pneumatic circuit for a commercial vehicle air compressor is illustrated. The pneumatic circuit includes an air compressor 10, a governor 12, an air dryer 14, and a supply reservoir 16. The air compressor 10 is optionally a single-cylinder reciprocating air compressor having an inlet port 18 for connection to an inlet line 36 of naturally aspirated or boosted air. The air compressor 10 also includes a discharge port 20 in fluid communication with the air dryer 14 and an unloader port 22 in fluid communication with the governor 12. The governor 12 includes a reservoir port 24 for connection to the supply reservoir 16, an unloader port 26 for connection to the air compressor 10, and an air dryer port 28 for connection to the air dryer 14. Lastly, the air dryer 14 includes an inlet port 30 in fluid communication with the compressor discharge port 20, an outlet port 32 in fluid communication with the supply reservoir 16, and a control port 34 in fluid communication with the governor 12. The compressor inlet port 18 can be in fluid communication with an inlet check valve (not shown) in the air inlet line 36.

As also shown in FIG. 1, the air compressor 10 includes a crankcase 40 and a cylinder head 42. The particular construction of the air compressor 10 can vary from application to application, and is depicted here as a single-cylinder reciprocating air compressor merely for illustrative purposes. The cylinder head 42 includes the inlet port 18, the discharge port 20, and the unloader port 22, as well as an internal suction chamber and an internal discharge chamber. Additional cylinder head ports include water ports for cooling and oil port for lubrication in the crankcase.

Figure 2:
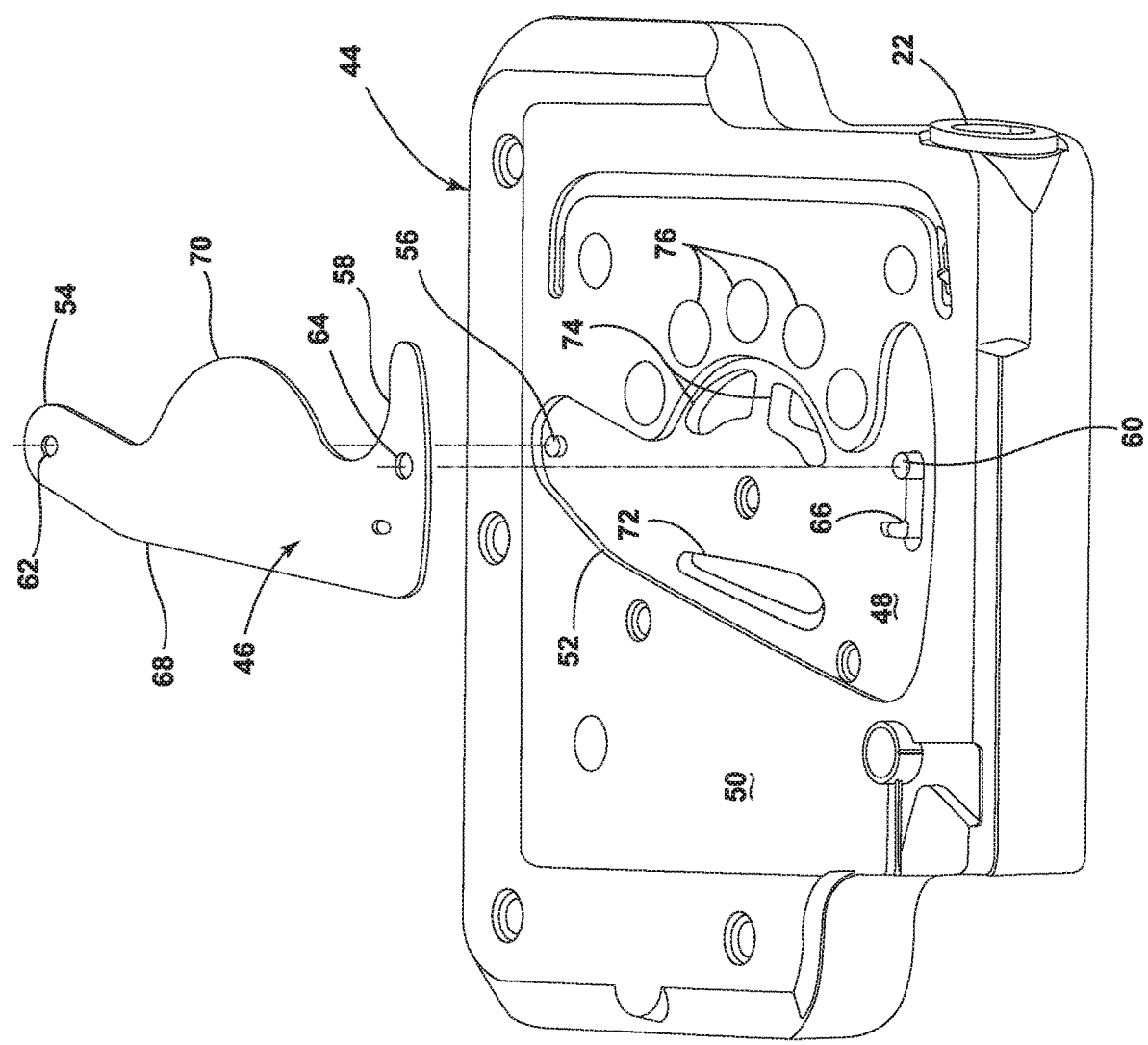
FIG. 2 is an inverted perspective view of a cylinder head manifold including a discharge cut-off valve in accordance with a current embodiment.

Referring now to FIG. 2, the cylinder head manifold 44 is illustrated in the inverted position to depict a hinged leaf valve 46. The hinged leaf valve 46 is seated within a recess 48 in the cylinder head manifold 44. The recess 48 is set back from a bearing face 50 for bearing against a cylinder piston chamber, the bearing face 50 completely surrounding the recess 48. The recess 48 includes a depth at least equal to the thickness of the hinged leaf valve 46 and is bordered by a sidewall 52. The hinged leaf valve 46 is rotatably anchored at a first end 54 to a joint pin 56 and is guided at a second end 58 by guide pin 60. The joint pin 56 extends through an opening 62 in the first end 54 of the hinged leaf valve 46 and the guide pin 60 extends through an opening 64 in the second end 58 of the hinged leaf valve 46. The guide pin 60 is movable along a groove 66 by actuation of an unloader valve (not shown). The hinged leaf valve 46 includes an elongated, plate-like body having a straight edge portion 68 opposite a rounded edge portion 70.

As also shown in FIG. 2, the recess 48 in the cylinder head manifold 44 includes at least two openings: a discharge vent opening 72 and unloader vent openings 74. The discharge vent opening 72 interconnects the piston chamber (via a discharge reed valve) and a discharge chamber within the cylinder head 42, which ultimately leads to the discharge port 20. The unloader vent openings 74 interconnect the piston chamber to a suction chamber (or inlet chamber) within the cylinder head 42, which ultimately leads to the inlet port 18. The bearing face 50 includes round inlet openings 76 that are covered by an inlet valve (not shown), for example a reed valve, that opens toward the piston chamber.

Figure 3:
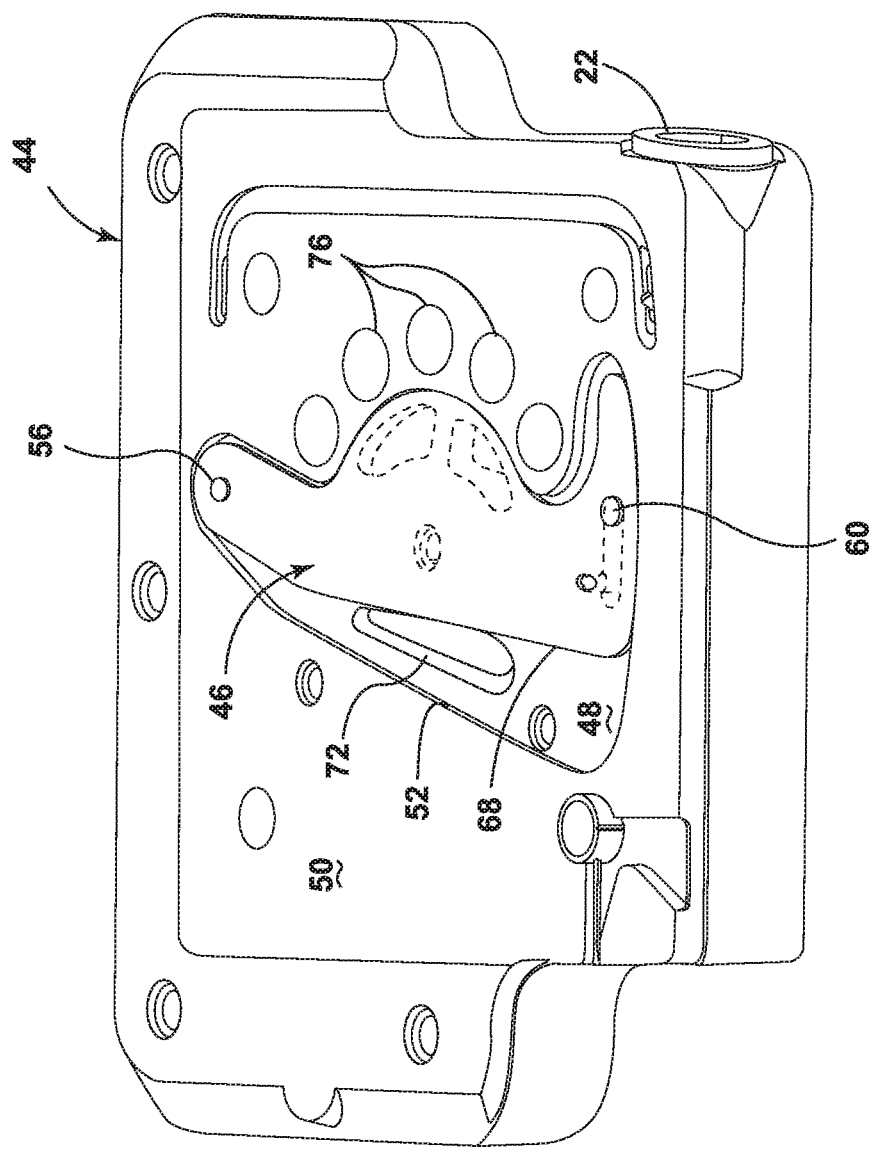
FIG. 3 is an inverted perspective view of the discharge cut-off valve of FIG. 2, the discharge cut-off valve being open during an on-load phase.

Operation of the air compressor 10 includes an on-load phase and an off-load phase. During the on-load phase as shown in FIG. 3, the rounded edge portion 70 abuts the sidewall 52, while the straight edge portion 68 is spaced apart from the sidewall 52. In this position, the hinged leaf valve 46 covers (closes) the unloader vent openings 74 while the discharge vent opening 72 is uncovered. In this on-loading phase, boosted or naturally aspirated air flows into the piston chamber via the intake openings 76. As the reciprocating piston moves to top dead center, the pressure within the air compressor is increased, causing the air compressor's discharge valve to open. Compressed air is allowed to pass through the discharge vent opening 72, ultimately through the compressor discharge port 20 for output to an air dryer 14.

Figure 4:
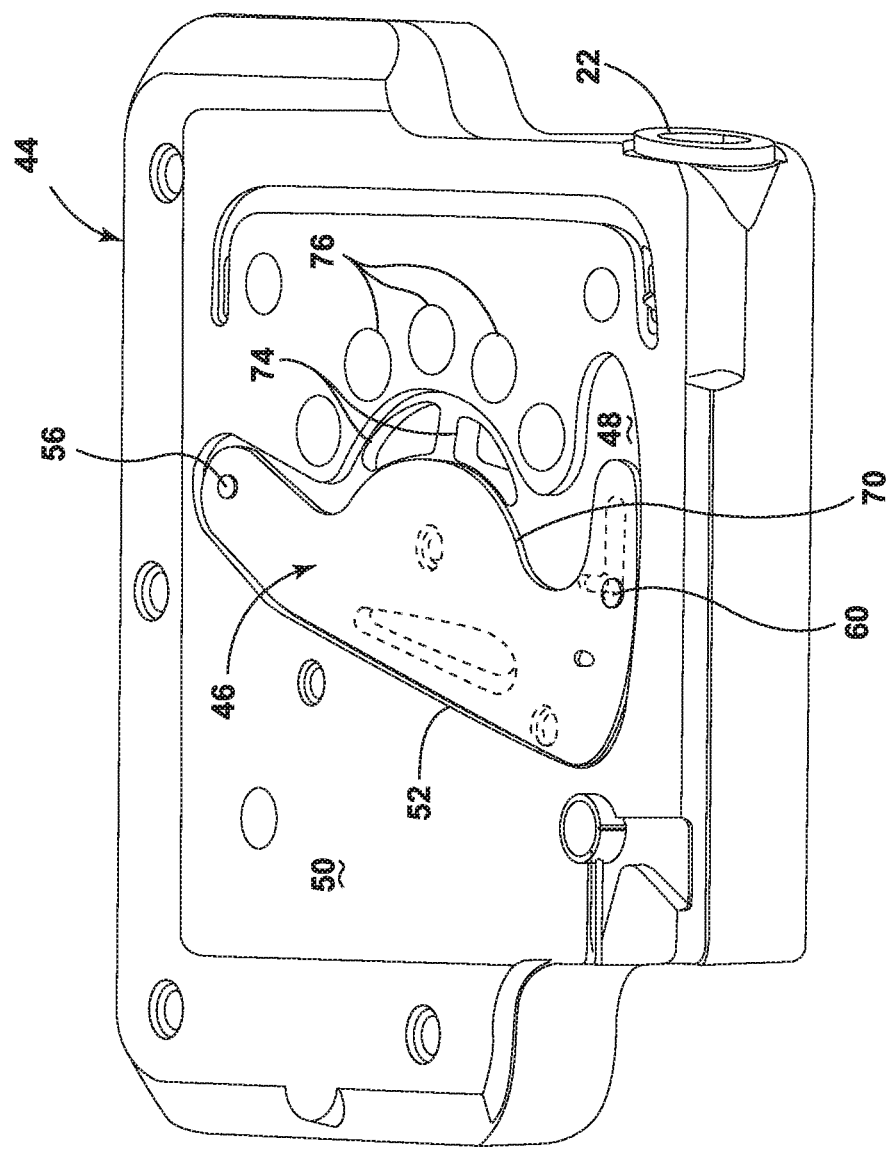
FIG. 4 is an inverted perspective view of the discharge cut-off valve of FIG. 2, the discharge cut-off valve being closed during an off-load phase.

During the off-load phase as shown in FIG. 4, the system pressure at the governor unloader port 22 causes movement of the guide pin 60 (left) via an unloader valve, for example the unloader valve disclosed in U.S. Pat. No. 8,960,073 entitled "Cylinder Head for a Compressor," the disclosure of which is incorporated by reference in its entirety. The guide pin 60 causes rotation of the hinged leaf valve 46 (left as shown in FIG. 4). In this position, the straight edge portion 68 abuts the sidewall 52, and the hinged leaf valve 46 covers or closes the discharge vent opening 72. The unloader vent openings 74 are uncovered, and air within the piston chamber is in fluid communication with the suction chamber within the cylinder head 42. Compressed air is allowed to pass through the unloader vent opening 74, ultimately through the compressor inlet port 18 in fluid communication with air inlet line 36.

Figure 5:
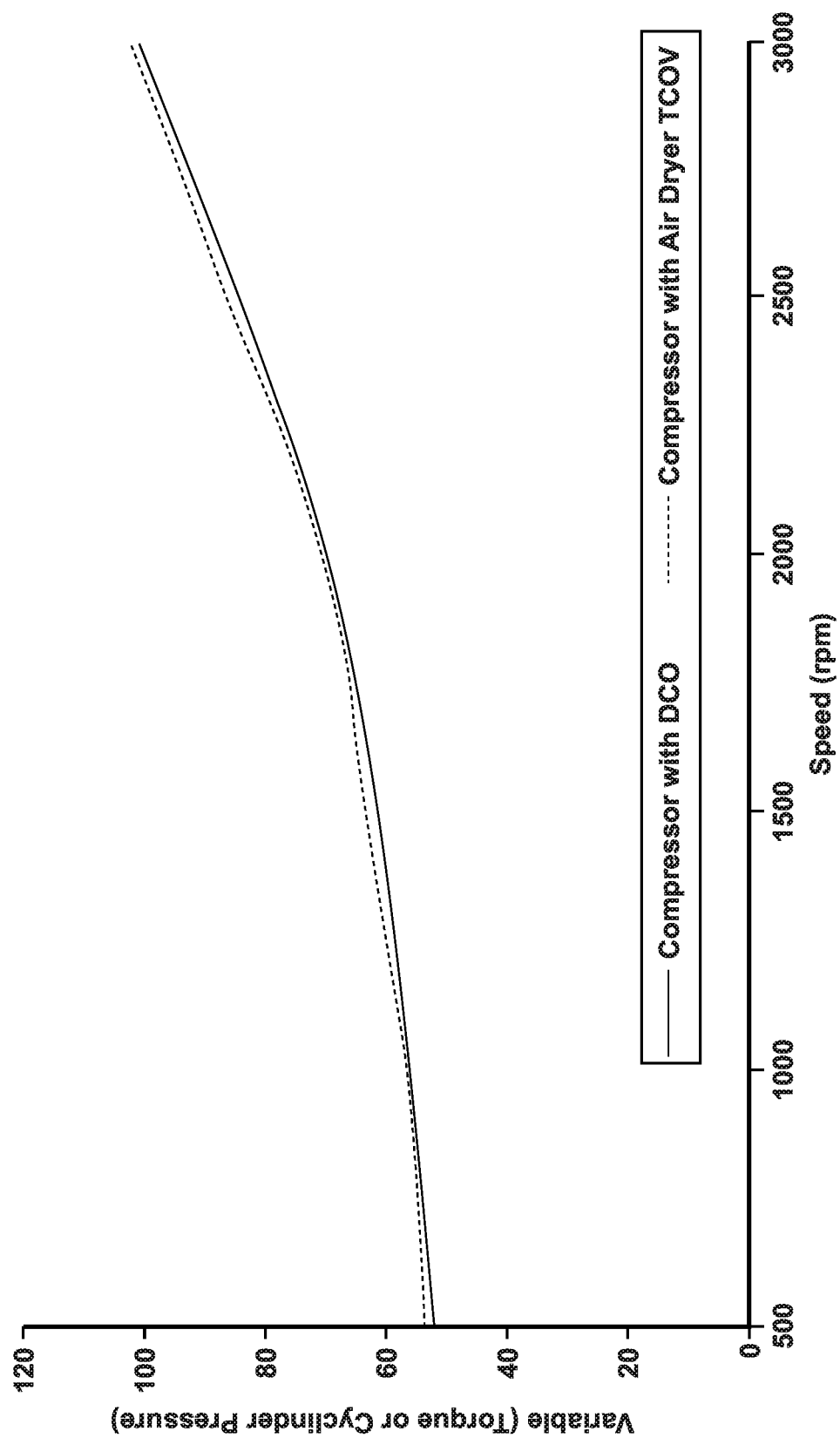
FIG. 5 is a graph including a comparison of the air compressor torque or cylinder pressure as a function of compressor speed (rpm).

As shown in FIG. 5, laboratory testing confirmed that the hinged leaf valve 46, as a discharge cut-off mechanism, can be used without a downstream TCOV to prevent boost air loss during the off-load phase. The chart presented in FIG. 5 shows no discernable difference in the peak cylinder pressure when compared to current designs lacking a discharge cut-off. Because the hinged leaf valve 46 is adapted to prevent the flow of air from the discharge port 20 of the air compressor 10 during the off-load phase, the downstream air dryer 14 is not required to include a separate TCOV valve to stop the flow of pressurized air, for example boost air, from the air compressor. Downstream modifications are therefore not required, and the air compressor 10 can be coupled with advanced air processing units which maintain pressure in the discharge line during the off-load phase. Though primarily adapted for applications involving boosted air, the discharge cut-off can also be used for naturally aspirated applications that require a blocked discharge port during the off-load phase.

The above description is that of current embodiments. Various alterations can be made without departing from the spirit and broader aspects of the invention as defined in the claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A discharge cut-off valve for an air compressor comprising:
   a cylinder head manifold including a recessed portion and a bearing face surrounding the recessed portion, the recessed portion including a discharge vent opening and an unloader vent opening, the bearing face including a plurality of inlet openings;
   a hinged leaf valve disposed within the recessed portion of the cylinder head manifold, the hinged leaf valve being rotatably anchored at a first end by a joint pin and being guided at a second end by a guide pin,
   wherein the hinged leaf valve is moveable between a first position during an on-load phase of the air compressor and a second position during an off-load phase of the air compressor,
   wherein, in the first position, the hinged leaf valve is seated over the unloader vent opening while the discharge vent opening is uncovered by the hinged leaf valve, such that air enters a piston chamber via the plurality of inlet openings, is compressed in the piston chamber, and escapes the piston chamber via the discharge vent opening to a discharge port, and
   wherein, in the second position, the hinged leaf valve is seated over the discharge vent opening while the unloader vent opening is uncovered by the hinged leaf valve, such that air enters the piston chamber via the plurality of inlet openings and escapes the piston chamber via the unloader vent opening to a compressor inlet port.

2. The discharge cut-off valve of claim 1 wherein the guide pin is movable along a groove in the recessed portion by actuation of an unloader valve.

3. The discharge cut-off valve of claim 1 wherein the plurality of inlet openings are in fluid communication between a suction chamber and the piston chamber.

4. The discharge cut-off valve of claim 1 wherein the recessed portion includes a depth at least equal to a thickness of the hinged leaf valve and is bordered by a sidewall that interconnects the recessed portion and the bearing face.

5. The discharge cut-off valve of claim 1 wherein the hinged leaf valve includes a straight edge portion opposite a rounded edge portion.

6. The discharge cut-off valve of claim 1 wherein the hinged leaf valve is biased in the first position.

7. An apparatus comprising:
   an air compressor including an inlet port, discharge port, an unloader port, and a piston chamber;
   an air dryer coupled to the discharge port of the air compressor, the air dryer including an output port and a control port and lacking a turbo cut-off valve;
   a supply reservoir coupled to the output port of the air dryer;
   a governor coupled to the control port of the air dryer and coupled to the unloader port of the air compressor,
   wherein the air compressor includes a cylinder head manifold including a recessed portion and a bearing face surrounding the recessed portion, the recessed portion including a discharge vent opening and an unloader vent opening, the bearing face including a plurality of inlet openings, the cylinder head manifold further including a discharge cut-off valve to selectively prevent the escape of compressed air from the discharge port of the air compressor, the discharge cut-off valve including:
      a hinged leaf valve disposed within the recessed portion of the cylinder head manifold and being rotatably anchored at a first end to a joint pin and being guided at a second end by a guide pin, the hinged leaf valve being moveable between a first position during an on-load phase and a second position during an off-load phase,
      wherein, in the first position, the hinged leaf valve is seated over an unloader vent opening while a discharge vent opening is uncovered by the hinged leaf valve, such that air from the inlet port enters the piston chamber via the plurality of inlet openings, is compressed in the piston chamber, and escapes the piston chamber via the discharge vent opening to the discharge port, and
      wherein, in the second position, the hinged leaf valve is seated over the discharge vent opening while the unloader vent opening is uncovered by the hinged leaf valve, such that air from the inlet port enters the piston chamber via the plurality of inlet openings and escapes the piston chamber via the unloader vent opening to the inlet port,
      such that the air dryer does not receive compressed air from the discharge port of the air compressor during the off-load phase.

8. The apparatus of claim 7 wherein the unloader vent opening is connected between the piston chamber of the air compressor and a suction chamber of the air compressor.

9. The apparatus of claim 7 wherein the discharge vent opening is connected between the piston chamber of the air compressor and a discharge chamber of the air compressor.

10. The apparatus of claim 7 wherein the guide pin is movable by actuation of an unloader valve in response to a supply pressure at the unloader port of the air compressor.

11. The apparatus of claim 7 wherein the hinged leaf valve is biased in the first position.

12. The apparatus of claim 7 wherein the air compressor includes an inlet valve and a discharge valve, the inlet valve and the discharge valves being reed valves and being separate from the hinged leaf valve.

13. A method comprising:
providing an air compressor including an inlet port for attachment to a supply of boosted air and a discharge port for attachment to an air dryer lacking a turbo-cut off valve;
during an on-load phase of operation, causing the discharge of air from the air compressor discharge port;
during an off-load phase of operation, preventing the discharge of air from the air compressor discharge port by actuation of a discharge cut-off valve;
wherein the discharge cut-off valve includes a hinged leaf valve that is movable between a first position during the on-load phase and a second position during the off-load phase, the hinged leaf valve being disposed in a recessed portion of a cylinder head manifold, the recessed portion including an unloader vent opening and a discharge vent opening,
wherein, in the first position, the hinged leaf valve is seated over the unloader vent opening while the discharge vent opening is uncovered, the discharge vent opening being in fluid communication between a piston chamber and the air compressor discharge port,
wherein, in the second position, the hinged leaf valve is seated over the discharge vent opening while the unloader vent opening is uncovered, the unloader vent opening being in fluid communication between the piston chamber and the air compressor inlet port.

14. The method of claim 13 wherein the unloader vent opening is connected between the piston chamber of the air compressor and a suction chamber of the air compressor.

15. The method of claim 13 wherein the discharge vent opening is connected between the piston chamber of the air compressor and a discharge chamber of the air compressor.

16. The method of claim 13 wherein the hinged leaf valve is rotatably anchored at a first end by a joint pin and is guided at a second end by a guide pin.

17. The method of claim 16 wherein the guide pin is movable along a groove by actuation of an unloader valve.

* * * * *